United States Patent [19]
Friesen

[11] Patent Number: 4,767,299
[45] Date of Patent: Aug. 30, 1988

[54] ROTATIONAL MOLDING MACHINE

[76] Inventor: Peter Friesen, R.R. #1, Box 314, Group 24, Winkler, Manitoba, Canada, R0G 2X0

[21] Appl. No.: 5,243

[22] Filed: Jan. 20, 1987

Related U.S. Application Data

[63] Continuation-in-part of Ser. No. 822,020, Jan. 27, 1986.

[51] Int. Cl.⁴ .................. B29C 39/08; B29C 39/44
[52] U.S. Cl. .................................. 425/135; 52/29; 52/173 R; 425/429
[58] Field of Search .............. 425/429, 430, 434, 135; 264/310, 311; 52/27, 29, 35, 173 R

[56] References Cited

U.S. PATENT DOCUMENTS

| | | | |
|---|---|---|---|
| 2,681,472 | 6/1954 | Rempel | 425/430 |
| 3,683,062 | 8/1972 | von der Heide | 264/310 |
| 3,715,179 | 2/1973 | Westbrook et al. | 425/425 |
| 3,938,928 | 2/1976 | Andrews | 425/430 |
| 4,028,038 | 6/1977 | Haigh | 425/430 |
| 4,247,279 | 1/1981 | Masters | 425/429 |

*Primary Examiner*—Willard Hoag
*Attorney, Agent, or Firm*—Adrian D. Battison; Stanley G. Ade; Murray E. Thrift

[57] ABSTRACT

A rotational molding machine having an oven enclosed by a pivotable top clam shell cover, front entry doors for interior oven access, and a spider arm and drive spindle which is supported by bearing members on opposite walls of the oven for removable mounting thereon.

9 Claims, 6 Drawing Sheets

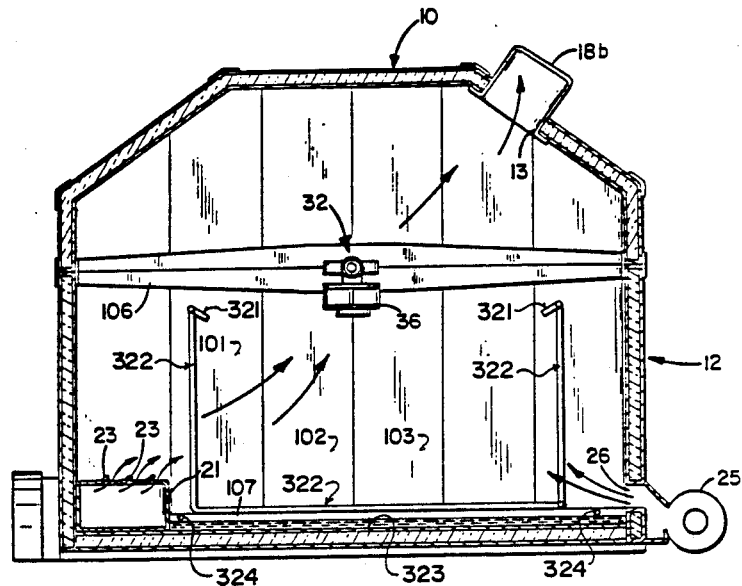
FIG. 6
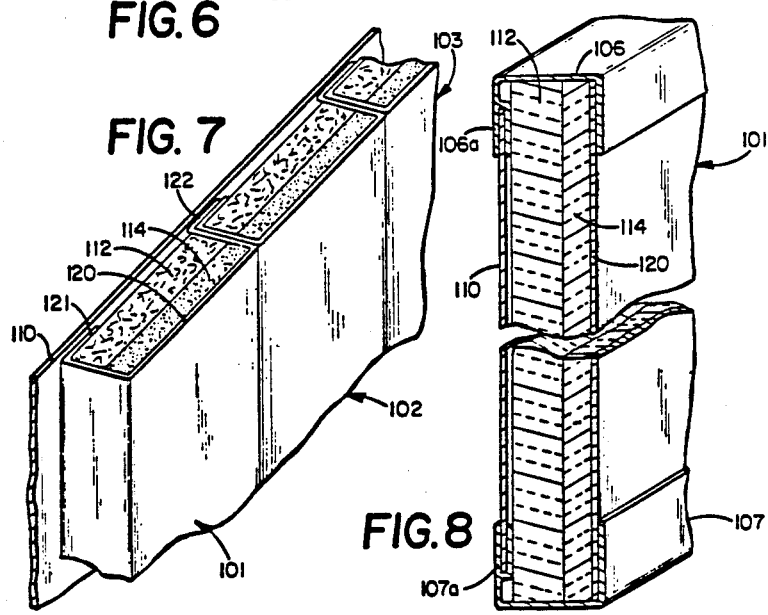
FIG. 7
FIG. 8

ROTATIONAL MOLDING MACHINE

This application is a continuation in part of my copending application Ser. No. 822,020 filed Jan. 27, 1986.

BACKGROUND OF THE INVENTION

The present invention relates to machines for molding plastics, and more particularly to rotational molding machines wherein the molding process is carried out within a heated over, and the mold is rotated about two axes under controlled conditions.

Rotational molding machines are particularly adapted for the manufacture of large parts from vinyl plastisols. The particular materials which work well in conjunction with rotational molding machines include thermoplastic polyethylene powders, and particularly low density polyethylene. Other forms of thermoplastic powders which have been commercially used with rotational molding machines include low and high density polyethylene, polyethylene copolymers, cellulose acetate-butyrate, vinyl dry blends, impact styrenes, and high-modulate thermoplastics. These materials are introduced into a mold in either a heat convertible liquid or a powder, and the rotational molding process changes the physical form of the material to a continuous solid. This change occurs while the mold is rotationally moved about two perpendicular axes while being held within the machine.

A rotational molding machine may be adapted to hold one or a plurality of molds during the rotational molding process, the molds being held into the machine by a frame work called a spider. A two-axis drive is imparted to the spider to cause the necessary rotational movement during the process.

Rotational molding machines are generally classified into batch-type machines or continuous machines. Continuous rotational molding machines typically are semi-automated or fully automated, having a plurality of driven spindles upon which the spiders are attached, and the path of travel of the spiders passes through various processing stations to permit loading, heating, cooling and stripping of the molds while the machine operates more or less continuously. The batch-type rotational molding machine, which is the subject of the present invention, typically utilizes a rotatable spider mounted within an oven, and the loading, heating, cooling and stripping process steps are usually manually performed while the spider is in a fixed position within the oven. In some cases the molds are moved manually from the oven to a cooling, unloading and filling station, wherein some of these operational process steps may be performed outside of the oven.

The manual handling steps required with batch rotational molding machines are time consuming and difficult to perform. In particular, the steps associated with loading and unloading the molds into the machine require considerable time, thereby adversely affecting the production rate of such machines. Accordingly, there is a need for a batch rotational molding machine which may be quickly loaded and unloaded, and which at the same time will facilitate the execution of the molding process steps required.

SUMMARY OF THE INVENTION

The invention comprises a rotational molding machine of a clam shell design, having an oven enclosed by a pivotable top clam shell cover, and having entry doors which are readily opened for access into the machine, and having an exhaust coupling to the clam shell cover which is automatically disconnectable when the cover is opened. Further, the machine includes a spider arm and drive spindle support and bearing mechanism which facilitates a quick-change operation of the spider arm, and a self-contained heating and recirculation system which is at least partially incorporated into the clam shell cover. The oven walls are constructed of free-floating insulated panels to allow for temperature expansion and contraction, and to completely insulate the oven and the clam shell cover. The invention includes a spider driving mechanism for providing rotational motion about two mutually perpendicular axes, and means for connecting a spider to a spindle arm so as to impart this rotational motion to the spider.

It is an object of the present invention to provide an improved batch rotational molding machine having free-floating insulated panels for compensating for temperature expansion and contraction.

It is another object of the present invention to provide a rotational molding machine having a clam shell cover and access doors for ease of access and egress to the machine.

It is a further object of the present invention to provide a rotational molding machine having a spider and spindle arm assembly and bearing mechanism to permit quick removal and replacement of the arm, spider and mold, and to provide two-axis rotation of the spider and mold.

It is another object of the present invention to provide a batch rotational molding machine having controllable and self-contained heating and cooling systems, including a heat exhaust system which is connectable into an industrial plant exhaust system.

BRIEF DESCRIPTION OF THE DRAWINGS

The foregoing and other objects and advantages will become apparent from the following specification and claims, and with reference to the appended drawings, in which:

FIG. 6 shows a cross section view taken along the lines 6—6 of FIG. 1; and FIG. 7 shows an isometric view of a panel section; and FIG. 8 shows a further partial cross section and isometric view of the oven panels.

DESCRIPTION OF THE PREFERRED EMBODIMENT

Figures 1, 2:
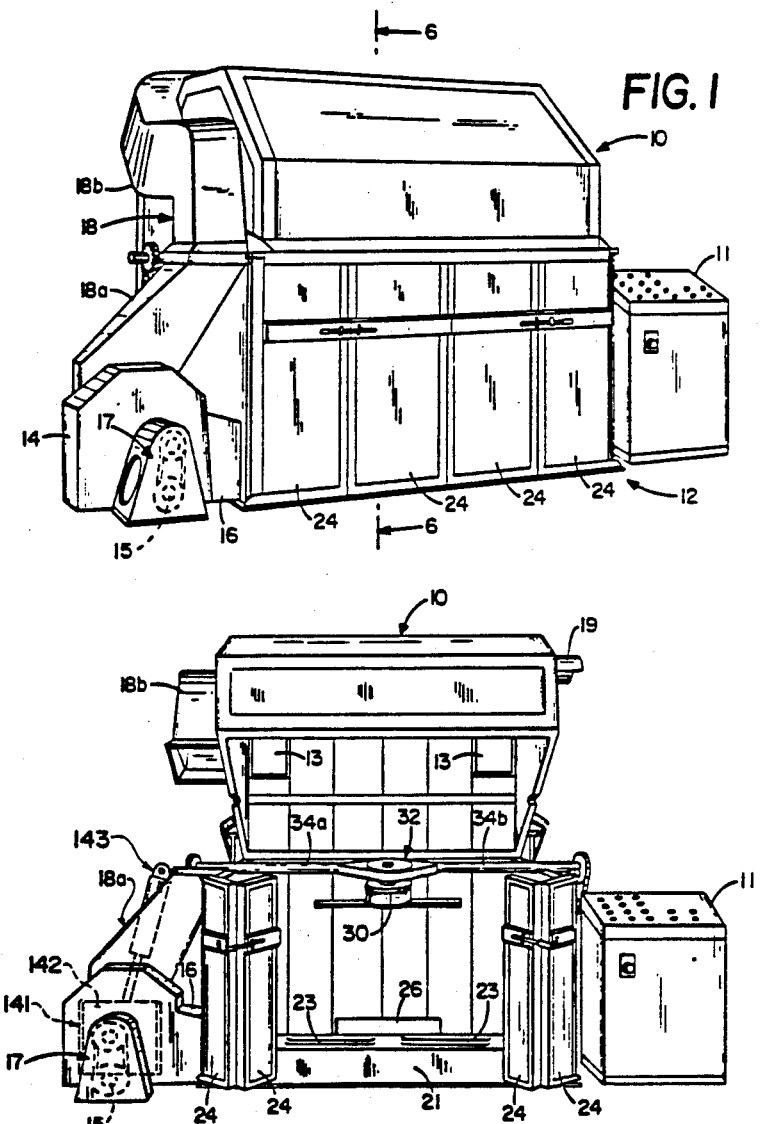
FIG. 1 shows an isometric front view of the invention.
FIG. 2 shows a front elevation view with the clam shell cover and doors open.

Referring first to FIG. 1, the invention is shown in front isometric view. A lower housing 12 supports a clam shell cover 10 which is pivotally attached thereto, and an oven is formed by the enclosure within lower housing 12 and clam shell cover 10. A plurality of doors 24 are openable to provide interior access to the oven. A blower 14 provides air circulation via lower duct 16 and upper duct 18. Blower 14 is driven by a motor 15, through drive connection 17. Lower duct 16 is fixedly attached to lower housing 12, and upper duct 18 has a section 18a fixedly attached to lower housing 12, and a section 18b fixedly attached to clam shell cover 10. A control panel 11 is mounted in a cabinet and is connected to the various driven members and sensors to be hereinafter described, to control the operation of the invention.

FIG. 2 shows the invention of FIG. 1 with clam shell cover 10 in its open position, and doors 24 hinged to their open positions. A gas burner is mounted to the rear outside wall of lower housing 12, and a burner opening 26 is formed through the lower rear section of the oven. When clam shell cover 10 is in its raised position the upper duct section 18b separates from lower duct section 18a, thereby disconnecting the air recirculation system from blower 14. Blower 14 has a lower duct 16 which is coupled into the side of lower housing 12. Duct 16 opens into a plenum 21 which extends across the lower front section of the floor of the interior oven. Plenum 21 has a plurality of vents 23 for directing the flow of blower 14 air upwardly toward the center volume of the oven. The interior walls of the clam shell cover 10 have a plurality of duct openings 13, for receiving air flow, which are coupled in flow communication to upper duct section 18b. When the clam shell cover 10 is in its closed position the air flow passes from upper duct section 18b, through lower duct section 18a, to a return opening into blower 14. In this manner, a complete closed recirculation air flow path is developed through the oven for maintaining uniform heat and eliminating hot spots. When clam shell door 10 is open the circulation air system is broken, and blower 14 then serves to provide a source of cooling air into the oven through vents 23. Cooling air is drawn into the fan 14 through an opening 141 (FIG. 2) in a rear wall of the fan housing. Normally the opening 141 is closed by a corer 142 which can be opened automatically by an actuator 143 on opening of the clam shell upper cover member 10. The dimension of the opening 142 is significantly greater than that of the duct 18 so that the latter acts to throttle the fan 14. In this way the single fan can run at low horsepower during the circulation cycle drawing sufficient air for recirculation and can increase power when cooling is required automatically by opening of the cover 142. An exhaust duct 19 is located on the side of clam shell cover 10, and opens into the interior of the oven.

A spider 32 is suspended inside the oven between a left spindle arm 34a and a right spindle arm 34b. Left and right spindle arms 34a and 34b are supported in a manner to be hereinafter described. Spider 32 has a fixture holder 36 attached thereto, for purposes of providing an attachment means for one or more molds. Fixture holder 36 is rotatable about two axes, as will be hereinafter described.

Figure 3:
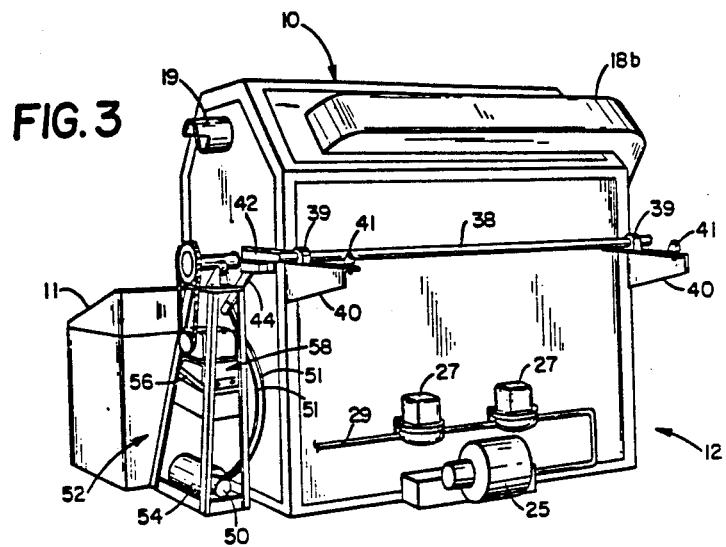
FIG. 3 shows an isometric rear view of the clam shell cover.

FIG. 3 shows a rear isometric view of the apparatus, with the clam shell cover 10 in a closed position. Upper duct section 18b extends across the rear portion of clam shell cover 10, coupling into vent openings 13 through the wall of clam shell cover 10. A gas burner 25 is mounted proximate the lower rear portion of lower housing 12, and is connected through suitable regulators 27 and a gas line 29 to a source of combustible gas.

Gas burner 25 operates through a burner opening 26 to the interior of the oven.

Clam shell cover 10 is pivotally hinged about a bar 38, which extends across the rear side of clam shell cover 10 and passes through a pair of journal bearings 39, one journal bearing 39 being affixed via a bracket 40 to either side of lower housing 12. A pair of rubber stops 41 are attached to brackets 40, and serve to limit the pivotal motion of clam shell cover 10. A linkage 42 is fixedly attached to each end of bar 38, as is illustrated in FIG. 3 and in FIG. 4. Linkage 42 is also fixedly attached to the side of clam shell cover 10. Pivotal motion of linkage 42 about its hinge point connection to bar 38 causes a corresponding pivotal motion of clam shell cover 10. Linkage 42 is connected to a hydraulically operated cylinder 44 through piston rod 45 which is connected to a cross pin 46, which pivotally attached to linkage 42 through suitable openings. Hydraulic cylinder 44 is itself pivotally attached to a bracket 47 by means of a pin 48 which is attached to hydraulic cylinder 44, and which passes into openings in bracket 47 and corresponding openings in a further bracket 49 attached to the side wall of lower housing 12. A pair of hydraulic hoses 51 couple hydraulic oil between hydraulic cylinder 44 and a hydraulic pump 50. Hydraulic pump 50 is mounted at the base of a carriage 52 which is positioned outside of lower housing 12. Hydraulic pump 50 is driven by a suitable electric motor 54.

Figure 4:
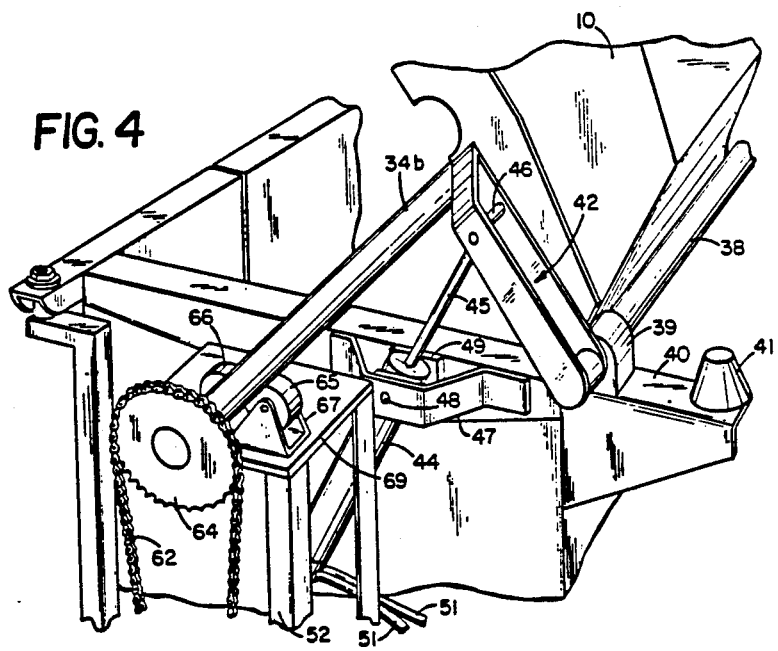
FIG. 4 shows a portion of the spindle arm and bearing assembly.
Figures 5, 9:
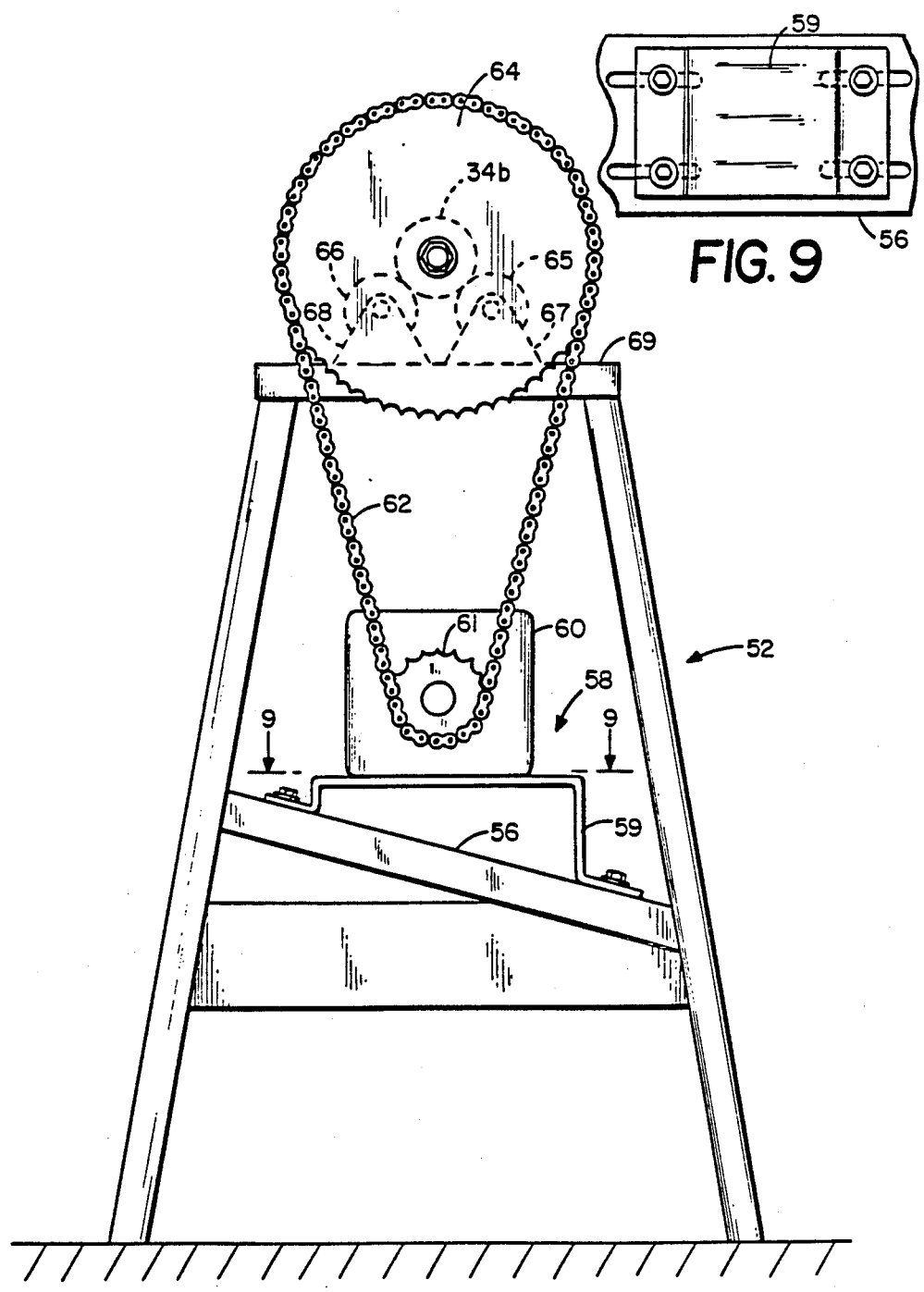
FIG. 5 shows an end view of the motor drive mechanism.
FIG. 9 shows a partial view taken along the lines 9—9 of FIG. 5.

Carriage 52 has an inclined plane 56 attached thereto, for the mounting of a motor drive assembly 58. Reference should be made to FIGS. 3, 4 and 5 for illustrative purposes. Motor drive assembly 58 comprises a mounting bracket 59 which is slidably mounted to inclined plane 56, and a motor drive 60 which is affixed to bracket 59. Drive motor 60 has a drive sprocket 61 attached thereto, for coupling to drive chain 62. Drive chain 62 is further coupled to a driven sprocket 64 which is affixed to the end of right spindle arm 34b. Reference should also be made to FIG. 9, which illustrates the slidable freedom between motor mount 59 and inclined plane 56. A plurality of slots in inclined plane 56 permit the selective adjustment of bolts interconnecting bracket 59 to inclined plane 56.

Driven sprocket 64 is rigidly affixed to right spindle arm 34b, and right spindle arm 34b is supported on a pair of rollers 65 and 66. Roller 65 is rotatably mounted to a roller mount 67, which is fixedly attached to a plate 69. Similarly, roller 66 is rotatably mounted to a roller mount 68 which is fixedly attached to plate 9. Rollers 65 and 66 provide mounting support for right spindle arm 34b, while permitting free rotation thereof.

An assembly similar to that shown in FIG. 5 is also found on the left side of lower housing 12, including a carriage 52, motor drive assembly 58, drive chain 62 and driven sprocket 64, rollers 65 and 66 and their associated mounting, but which differs in construction only in the details of the connection of driven sprocket 64 to its corresponding rotatable member. On the left side of lower housing 12 the driven sprocket 64, or its equivalent, is affixed to an interior shaft which passes through left spindle arm 34a to a geared connection inside of spider 32. Spindle arm 34a is rigidly affixed to spider 32, and rotates therewith. The rotatable supporting mechanism for spindle arm 34a functions as described above in connection with spindle arm 34b.

FIG. 6 shows a right side elevation view of the oven, in partial cross section to illustrate the oven insulation panels and air flow circulation system. Gas burner 25 emits a heating flame through opening 26 in the rear side of lower housing 12. The flame of gas burner 25 serves to provide the heat source for the oven, necessary to the rotational molding process. At the same time, blower 14 moves a volume of air through plenum 21 and vent openings 23. Vent openings 23 include deflectors for directing the air volume generally as indicated by the arrows in FIG. 6. Air flow is forced through the oven and past spider 32 so as to maintain a continuous supply of heated air over all portions of spider 32 and the molds which may be attached to fixture holder 36. Air flow continues upwardly and exits the oven through vents 13 and upper duct section 18b. The air is then returned to blower 14 in a manner described hereinbefore, and is recirculated through the oven. At the same time that air flow passes through the oven in the manner indicated, spider 32 is rotated about two mutually perpendicular axes. A first axis of rotation is aligned with spindle arms 34a and 34b, and a second axis of rotation is normal thereto. This enables all sides of the mold attached to fixture holder 36 to become equally exposed to a continuous flow of heated air during the rotational molding process.

In FIG. 6 there is shown an arrangement for cooling the molds subsequent to the heating process. This comprises a pair of water jet nozzles 321 which are arranged to direct water from a pipe system 322 onto the molds to assist cooling. As shown there are two such nozzles but it will be appreciated that further nozzles may be provided depending upon the size of the nozzle and the amount of water required so that the nozzles are shown mounted inside the oven on the suitable pipe work 322 but it will be appreciated that nozzles could be mounted outside the oven and arranged to project over the upper rim 106 when the upper cover member or clam shell is opened.

At the base of the oven is provided a water pan 323 at which the water from the nozzles 321 is collected. Drains 324 are provided at suitable locations around the periphery of the water pan to allow the escape of the water to a suitable drainage system (not shown) with the drains 324 mounted above the lower most level of the water pan 323 so as to retain a proportion of the water within the pan 323 up to a predetermined depth. The retained water is thus present in the oven when the heating cycle commences and acts to evaporate thus increasing the humidity within the oven and the transfer of heat from the hot air within the oven to the molds. It has been found that the presence of the water layer in the pan 323 significantly increases the efficiency of the heating system so that heat can be taken up more quickly and less heat is lost thus improving the efficiency of the process.

The entire outer periphery comprising clam shell cover 10 and lower housing 12 is formed from a plurality of panels. The panels are held between rigid channels, but no physical connection is made between the panels and the channels in which they are recessed. The panels are free to move in response to thermal expansion and contraction forces, but any such movement is guided within the channels in which the panels are mounted. A partially expanded view in cross section is shown in FIGS. 7 and 8, illustrating both the construction of the panels and the containment of the panels within channels which form a part of clam shell cover 10 and lower housing 12. For exemplary purposes a more detailed description of several of such panels will be made herein, it being understood that, the general constructional features apply to all of the panels forming a part of the oven.

Panels 101, 102 and 103 are typical of the construction of all of the panels in the apparatus. These panels are each held between an upper channel 106 and a lower channel 107. Channel 106 and channel 107 are each constructed in the form of U-channels, having their respective openings facing toward one another. Each of these openings constrain the upper and lower portions respectively of the panels held therebetween. FIG. 8 shows the constructional relationship between U-channels 106 and 107, and with reference to panel 101. An outer metal sheet 110 serves as a common exterior wall to all of the panel assemblies. Outer metal sheet 110 is constrained between U-channels 106 and 107, within respective slots 106a and 107a. A layer of insulation 112 is confined inside of panel 110, insulation layer 112 being formed of fiberglass or similar insulation material. A further insulation layer 114 is adjacent the inside of layer 112. Insulation layer 114 is preferably constructed from high temperature insulation material, capable of withstanding temperatures of approximately 1,200° F. An inner panel sheet 120 forms the inside wall of panel 101, and may be formed of material such as sheet metal. Inner sheet 120 is shaped as illustrated in FIG. 7, having an exterior tab portion 121 for confining insulation layers 112 and 114, and having a generally rectangular portion for partially surrounding the three sides of insulation layers 112 and 114, and having an outwardly extending tab 122 for engaging and interlocking against an adjacent panel 102. In this manner of construction, each panel is contained between an upper and lower U-channel member, and is further interlocked against its adjacent panel by means of the shaping of inner sheet 120.

Figure 10:
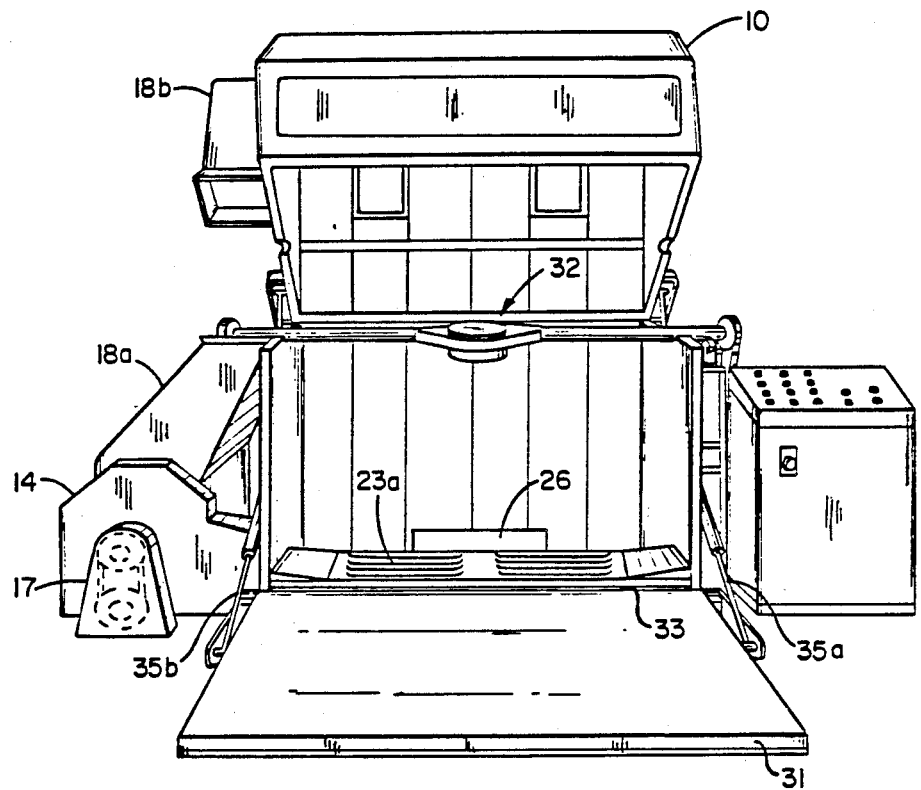
FIG. 10 shows a front view of an alternative form of the invention.
Figure 11:
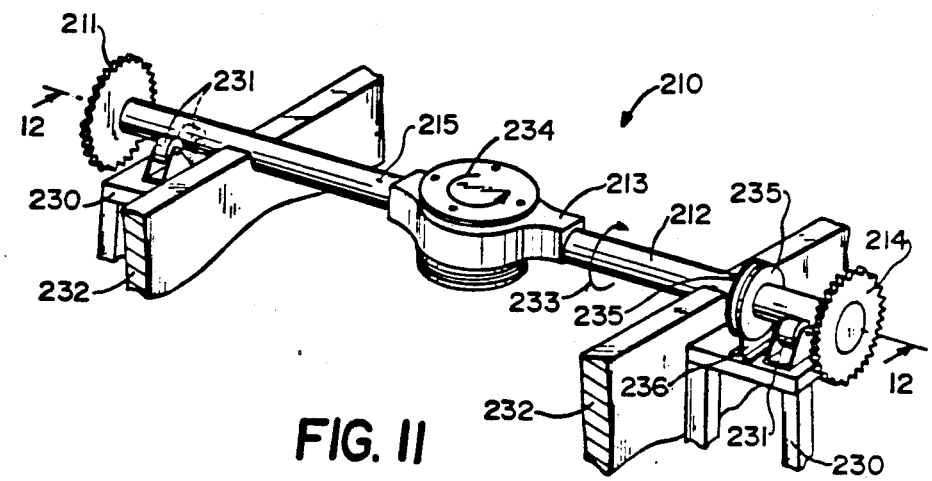
Figure 12:
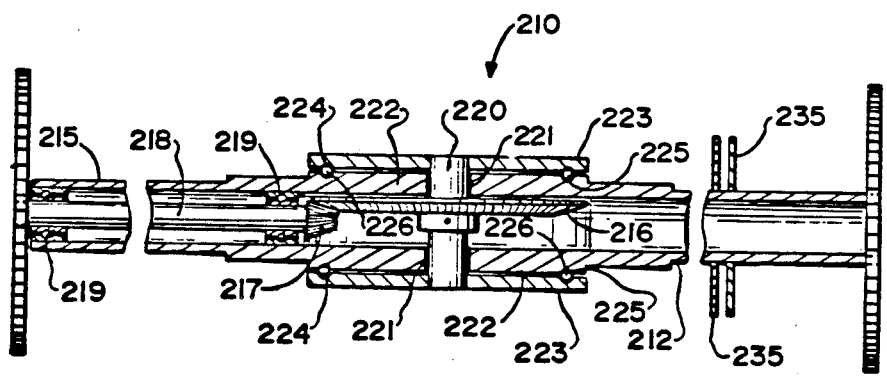

FIG. 10 shows an alternative form of the invention, utilizing a different approach for frontal access to the machine. The clam shell cover 10 is pivotally attached as has been described hereinbefore, and the upper and lower ducts 18b and 18a respectively are similarly connected. The gas burner opening 26 is positioned at the lower rear of the rear wall of the machine, and an air vent 23a is located in the floor of the machine proximate the front. A hingeable door 31 is provided, having a hinged mounting 33 adjacent the front edge of the floor of the machine. Door 31 is therefore pivotally hinged to move from an upper position wherein it encloses the oven portion of the machine, to a lower horizontal position for ease of access. Door 31 may be raised and lowered through the activation of cylinders 35a and 35b, which may be air-type cylinders or hydraulic cylinders. The embodiment of FIG. 10 has the advantage of providing a bigger access opening, and to some extent permits more rapid cooling of the oven when door 31 is swung to its open position.

In operation, and before the oven is fired up and the air circulation system is activated, the clam shell cover 10 is opened to expose the oven interior, and the doors 24 are opened to permit access into the oven. A spider 32, including left and right spindle arms 34a and 34b, and including fixture holder 36, and also including one or more molds attached to fixture holder 36, are lifted into the oven and lowered into position on respective roller pairs 65 and 66. The right and left side drive chains are connected about the respective driven sprockets, and the drive motor is positioned along inclined plane 56 to permit connection of the drive chains to the respective drive motors. The drive motors are then positioned along the inclined plane so as to create a predetermined chain tension for driving purposes, and the motors are fixedly attached to the inclined plane on either side of the oven. Next, the front doors are closed and the clam shell cover is closed, and the air circulation system and burner is actuated. The respective drive motors are turned on to impart rotational motion to spider 32 in two orthogonal directions. The righthand drive sprocket causes spider 32 to rotate about an axis aligned with left and right spindle arms 34a and 34b. The lefthand drive sprocket causes rotational motion of fixture holder 36 about an axis normal to the first axis, thereby causing the mold or molds attached to the fixture holder 36 to receive two-axis rotation. The respective rotation rates of the two axes are controlled by the controls on control panel 11, which permit regulation of the motor drive voltages. Control panel 11 also includes controls for setting the interior oven temperature, the air circulation system, and a timer for setting the operational cycle of the oven.

After the heating cycle is complete following a predetermined period of time which can be varied in dependence upon the materials to be processed, the heating system or burner can be turned off leaving the oven closed and effectively remaining at a constant temperature to hold the molds at that temperature for a curing period. This period within the oven without the application of heat can again reduce the amount of heat necessary for a particular part and thus improves the efficiency of the system in terms of heat usage.

After the curing is complete, the upper cover member or clam shell is opened and the front doors retained closed. This opening allows heat to escape upwardly by convection from the mold and at the same time automatically haults the recirculation of air due to the movement and separation of the duct 18. In addition the opening 141 in FIG. 2 is uncovered to allow cooling air to be drawn into the fan. The size of the opening 141 is such that the fan can draw as much air as it can propel so that the fan is unthrottled by the opening and thus using maximum power. The duct 18 is of a smaller dimension thus throttling the fan and automatically reducing the amount of power and the amount of air in the recirculation cycle. The actuator 143 automatically opens upon opening of the clam shell cover.

After the cooling cycle is complete, the front door forming the front wall is opened to allow access to the mold for opening and removal of the completed part.

The operation described above may be repeated for so long as a particular set of molds are needed for the manufacture of the molded parts. Another feature and advantage of the invention is that it facilitates, in certain cases, the quick changing of the entire arm, spider and mold assembly from the oven from one manufacturing run to the next manufacturing run. For example, the arm described herein may be replaced by an offset arm for handling molds of different and larger configurations than are possible with spider 32. To accomplish the quick change of the entire assembly, the sprocket chains are loosened and disconnected from the driven sprockets, and the entire assembly including spider 32 is lifted from the oven to a separate station for removing the material from the molds. A new spider and associated apparatus may immediately be inserted into the oven to begin a new molding process, even before the previous spider has been cooled and the molds broken to obtain the molded parts. In this manner, the oven may be used more or less continuously, with only brief intervals required for removal and replacement of the spider and mold assemblies.

In an alternative arrangement (not shown) the upper cover member 10 can be mounted for sliding movement rearwardly of the lower oven portion. In this case a front portion or front wall of the upper cover member can firstly pivot upwardly to open the front of the upper cover portion so that it can slide rearwardly and clear the mold within the oven. The upper cover portion in such an arrangement can move on rollers which are eccentrically mounted so that a first movement lifts the upper cover portion slightly away from the lower oven portion following which the cover can slide rearwardly onto a frame structure rearwardly of the lower oven portion. This action also breaks the duct 18 in the same manner as previously explained.

In a yet further alternative arrangement (not shown) the upper cover member can pivot about an axis spaced downwardly of the upper edge of the lower oven portion so that the majority of the rear wall forming the oven is part of the upper cover member. This can be used in an arrangement where the height of the area in which the machine is to be placed is not sufficiently high to allow full pivotal movement of the machine as shown in FIG. 1 in which case the lower pivot axis reduces the maximum height to which the upper cover member reaches.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

I claim:

1. A machine for use in rotational molding of the type for receiving and processing a mold in a first step in which the mold is loaded with a plastics material to be molded, in a second step in which the mold is rotated while it is heated, a third step in which the mold is rotated while it is cooled, and a fourth step in which the mold is unloaded, the machine comprising an enclosed housing defining therein a single chamber for receiving said mold, said housing including a base having a base member, means for supporting said housing relative to a ground surface consisting of said base member such that said housing is maintained by said base member in fixed position on the ground surface, a plurality of base walls, fixed to said base member so as to be generally upstanding from said base member and a cover member, door means provided in said housing for allowing access thereto, a mold, heating means for supplying heat into said housing at a position exteriorly of said mold, fan means, duct means connected to said fan means, said duct means including a first duct portion arranged to direct air from said fan means into said housing, a second duct portion arranged to withdraw air from said housing for recirculation to said fan means and a third duct portion arranged to draw exterior air for directing cooling air through said fan means to said housing, and means for selecting for connection to said fan means one of said second and third duct means, spray means arranged to spray a cooling liquid onto the mold during said third step and a water collection pan at the base of the housing arranged to collect at least some of said cooling liquid, said pan having a base plate on which the liquid is collected and an outlet positioned at a distance above the base plate so as to retain a predetermined quantity of said liquid within said pan in said housing for evaporation.

2. The invention according to claim 1 including means responsive to movement of said cover member into an open position thereof, said responsive means being arranged to actuate said selecting means so as to select said third duct means to direct cooling air into said base.

3. The invention according to claim 1 wherein said door means includes a first door in said front upstanding wall and a second door in said upper cover member and means for separately actuating said first and second doors whereby the second door only can be opened for said third step.

4. The invention according to claim 3 wherein said upper cover member includes a top and a plurality of depending side walls so as to define with said housing in a closed position thereof an interior chamber for receiving said mold on said spider, said upper cover member being moveably mounted relative to said housing so as define said second door and so as to be moveable from the closed position to an open position in which the cover member is spaced from a surrounding upper edge of said upstanding walls to expose said mold.

5. The invention according to claim 4 wherein said spindle arm assembly is mounted such that it enters said housing at said upper edge thereof so as to be fully exposed by opening of said upper cover member.

6. The invention according to claim 4 wherein said upper cover member is mounted on said housing for pivotal movement relative thereto about a horizontal axis at said rear wall.

7. The invention according to claim 4 wherein said first duct portion is attached to said base for directing said air into said housing through said base, wherein said second duct portion is attached to and carried by said cover member and wherein movement of said cover member from said closed position thereof to an open position thereof automatically disconnects said second duct portion from said fan means so as to halt recirculation of air through said fan means and to select the direction of cooling air through said fan means to said housing.

8. A machine for use in rotational molding of the type for receiving and processing a mold in a first step in which the mold is loaded with a plastics material to be molded, in a second step in which the mold is rotated while it is heated, a third step in which the mold is rotated while it is cooled, and a fourth step in which the mold is unloaded, the machine comprising an enclosed housing defining therein a single chamber for receiving said mold, said housing including a base having a base member, means for supporting said housing relative to a ground surface consisting of said base member such that said housing is maintained by said base member in fixed position on the ground surface, a plurality of base walls, fixed to said base member so as to be generally upstanding from said base member and a cover member, door means provided in said housing for allowing access thereto, a mold heating means for supplying heat into said housing at a position exteriorly of said mold, fan means, duct means connected to said fan means, said duct means including a first duct portion arranged to direct air from said fan means into said housing, a second duct portion arranged to withdraw air from said housing for recirculation to said fan means and a third duct portion arranged to draw exterior air for directing cooling air through said fan means to said housing, said second duct portion being arranged to throttle said fan, said third duct portion being of greater cross-section area than said second duct portion to reduce the throttling and including shutter means for closing said third duct portion, and means responsive to opening of said door means for automatically opening said shutter means.

9. The invention according to claim 8 wherein said plurality of base walls comprises a base front wall, a base rear wall and base side walls, each of said base walls being fixed to said base member so as to be generally upstanding from said base member to an upper edge of the respective base wall, said door means being provided in said front base wall arranged for movement into an open position to allow access into said base of an operative for said first and fourth steps and into a closed position to fully close said base for said second step and wherein said upper cover member comprises a top, a cover front wall, a cover rear wall and cover side walls, each of said cover walls being generally depending from said top to a lower edge of said respective cover wall, said cover member being arranged such that said base walls and said cover walls meet at said upper and lower edges respectively thereof to define said single interior chamber for receiving said mold, said upper cover member being movably mounted relative to said base so as to be movable from a closed position thereof closing said single interior chamber to an open position in which the cover member is spaced from said upper edges of said base walls to allow direct vertical access to said base and wherein there is provided a mold support member for supporting and driving said mold about two orthogonal axes, said support member being arranged to extend from one base side wall to the other base side wall, means for mounting said support member such that the support member extends across the upper edges of said base side walls at one fixed position relative thereto and such that said lower edges of said cover side walls can cover said support member when said cover member is in the closed position.

* * * * *